United States Patent [19]
Louderback et al.

[11] 3,727,066
[45] Apr. 10, 1973

[54] PROBE PHOTOMETER WITH FLUID SENSING DEVICE

[75] Inventors: Allan L. Louderback, Temple City; Robert P. Owen, Pasadena, both of Calif.

[73] Assignee: Baxter Laboratories, Inc., Morton Grove, Ill.

[22] Filed: May 1, 1970

[21] Appl. No.: 31,847

Related U.S. Application Data

[63] Continuation of Ser. No. 706,112, Feb. 16, 1968, abandoned.

[52] U.S. Cl. ................250/218, 250/206, 250/227, 356/201
[51] Int. Cl. ...........................................G01n 21/26
[58] Field of Search.....................250/218, 227, 206, 250/210, 238; 356/208, 201, 180–185; 350/96 R

[56] References Cited

UNITED STATES PATENTS

| | | | |
|---|---|---|---|
| 3,263,553 | 8/1966 | Baruch | 250/218 X |
| 3,319,514 | 5/1967 | McAllister, Jr. | 250/218 X |
| 3,101,414 | 8/1963 | Grabowsky | 250/218 |
| 3,470,261 | 9/1969 | Roberts | 250/218 X |
| 3,465,157 | 9/1969 | Martens | 250/210 X |
| 3,417,251 | 12/1968 | Leonard et al. | 250/218 X |
| 2,427,013 | 9/1947 | MacAdams | 250/218 X |

*Primary Examiner*—Walter Stolwein
*Attorney*—Samuel B. Smith, Jr.

[57] ABSTRACT

The invention is concerned with an improved probe-type of photometer, the probe of which may be inserted directly into a liquid or gas, to measure the light transmission through the fluid; and which may be used, for example, for spectrophotometric, turbidity, colorimetric, densitometer, or other measurements.

9 Claims, 5 Drawing Figures

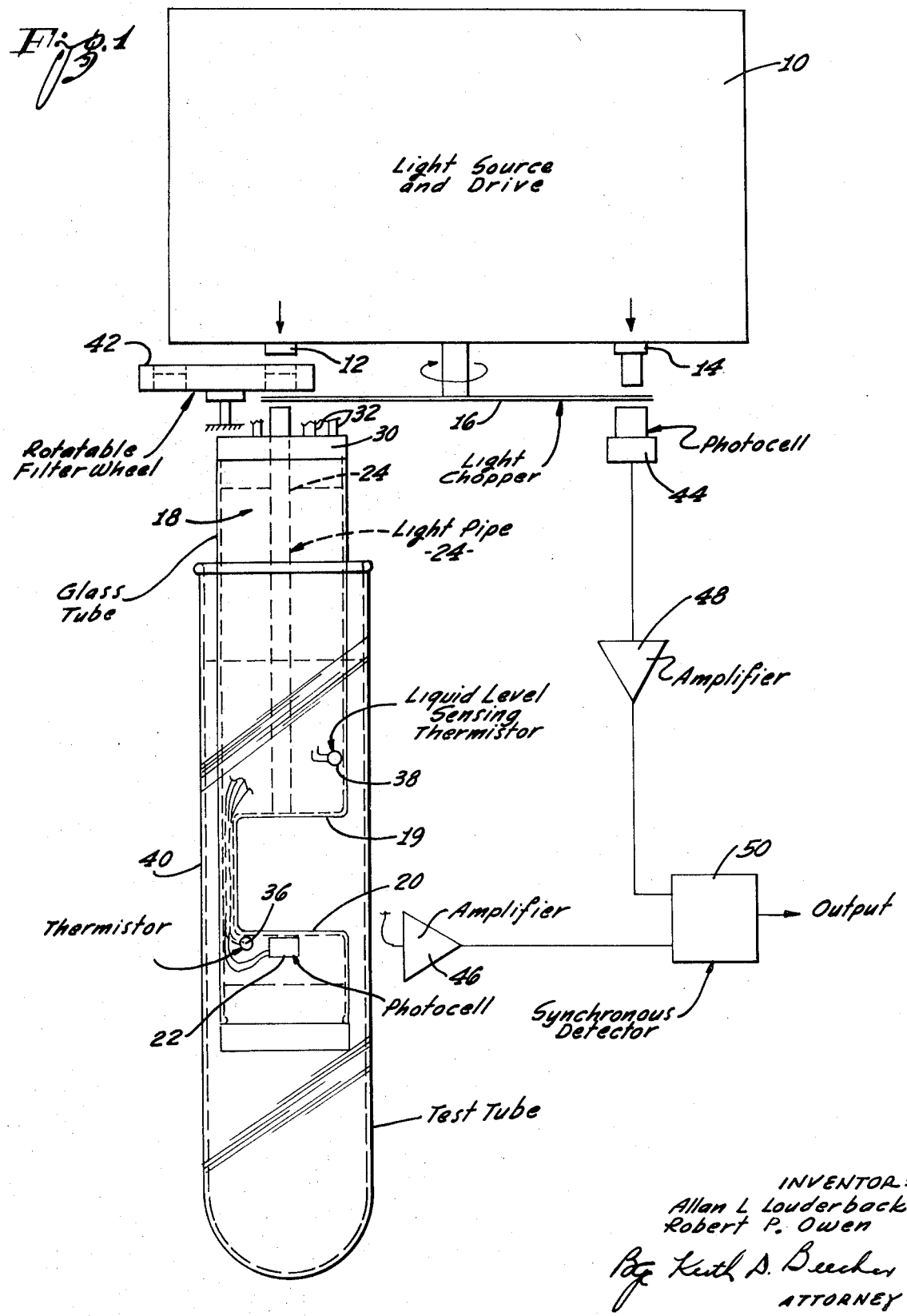

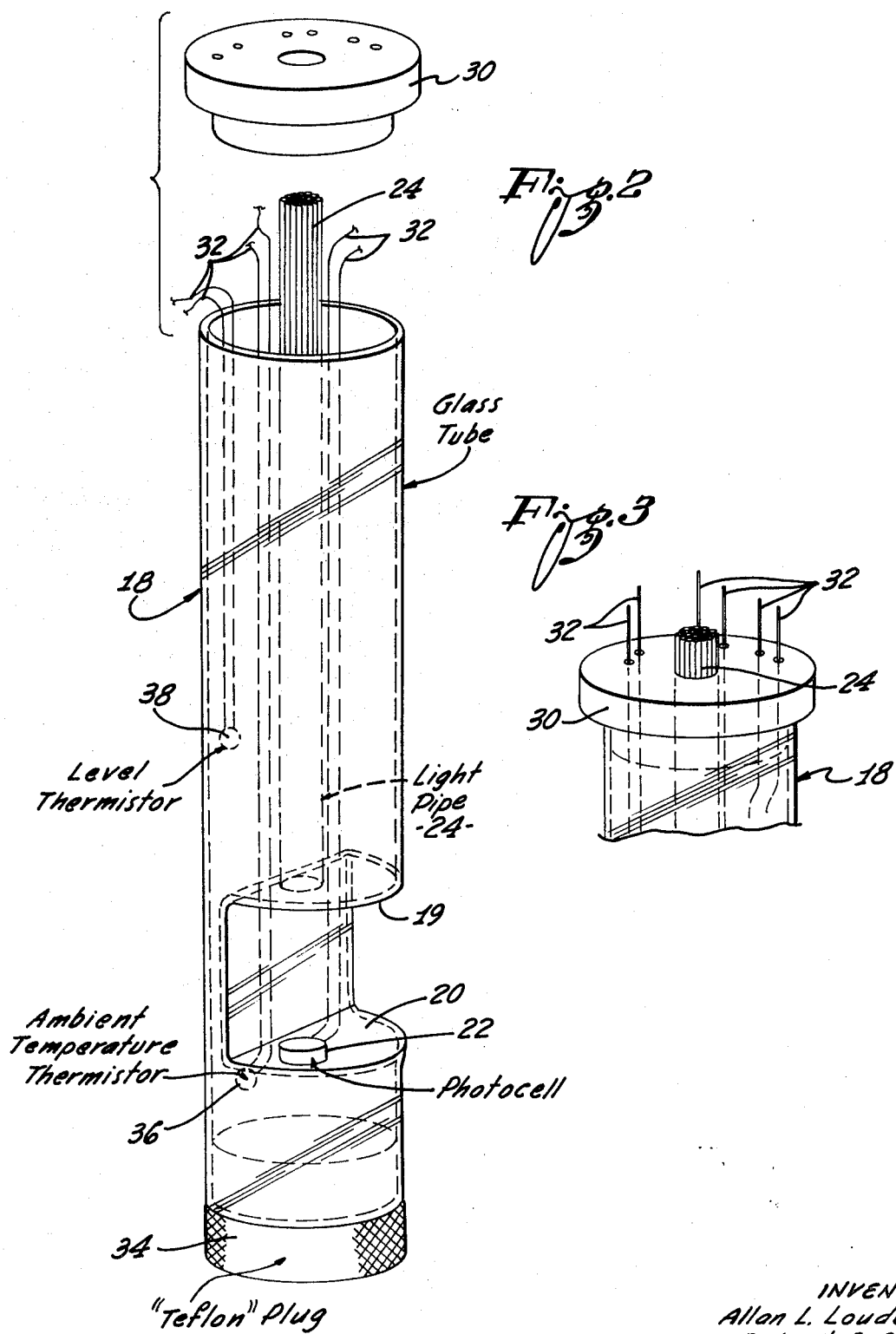

INVENTORS:
Allan L. Louderback
Robert P. Owen

By Keith D. Beecher
ATTORNEY 3,727,066

PROBE PHOTOMETER WITH FLUID SENSING DEVICE

The present application is a continuation of application Ser. No. 706,112, filed Feb. 16, 1968, now abandoned.

BACKGROUND OF THE INVENTION

The photometer of the invention finds particular utility in spectrophotometric measurements in which a selected wave-length of light is directed through a fluid sample towards a photocell; the resultant output from the photocell being a measurement of the "optical transmission" of the sample at that wave-length. However, as indicated above, and as will become more evident as the description proceeds, the photometer of the invention has general utility for a wide variety of measurements involving the measurement of light transmission through a fluid sample.

The probe-type of photometer of the invention permits the aforesaid spectrophotometric measurements to be made by immersing the photometer probe down into the fluid sample, the sample being contained, for example, in a test tube or other appropriate receptacle.

The photometer of the invention may conveniently be included in an automatic system, whereby a series of test tubes may be transported to the probe photometer station on a conveyor, and each test tube raised under the probe to enable the probe to be immersed in the fluid sample contained therein. In this way, measurements may be made of the fluid samples contained in the successive test tubes. The oututs from the photometer for each subsequent measurement may then be recorded as a series of "optical density" or "percent concentration" readings, this being achieved, for example, by equipment such as disclosed in copending application Ser. No. 675,165, filed Oct. 13, 1967, in the name of Lamont Seitz, assigned to the present assignee and now U.S. Pat. No. 3,593,007.

As indicated above, the probe photometer of the invention also finds utility for determining turbidity in the fluid sample, for colorimetric measurements, for densitometer purposes, and the like.

SUMMARY OF THE INVENTION

The invention provides an improved and simplified construction for a probe photometer which, in the embodiment to be described, comprises a glass tube configured to a selected shape and containing various electrical and electronic elements which make up the photometer. The wires from the aforesaid electric and electronic elements extend up the interior of the tube in the illustrated example, and these wires terminate, for example, in an electric plug at the end of the tube. A light pipe in the form of a rod-like member composed, for example, of an acrylic plastic, or other transparent material, also extends down through the tube, as will be explained. The light pipe functions in known manner to conduct light from one end to the other. The upper end of the light pipe may protrude up through a central aperture in the aforesaid electric plug.

The invention also provides a photometer unit of which the aforesaid probe is a component part, and which includes appropriate circuitry so that the output from the photometer is independent of any changes in the ambient light level, this being achieved by providing a reference system, and including a light chopper in the probe and reference system, so that the overall system is sensitive only to signals of a particular frequency, representing the light transmission through the sample; the system being independent of changes in ambient light conditions.

BRIEF DESCRIPTION OF THE DRAWINGS

FIG. 1 is a schematic representation of the apparatus and system of the present invention, in which the probe photometer is a component;

FIG. 2 is a perspective representation of a probe photometer constructed in accordance with one embodiment of the invention;

FIG. 3 is a fragmentary elevational view showing a plug mounted at one end of the probe photometer of FIG. 2;

DESCRIPTION OF THE ILLUSTRATED EMBODIMENTS

Figure 4:
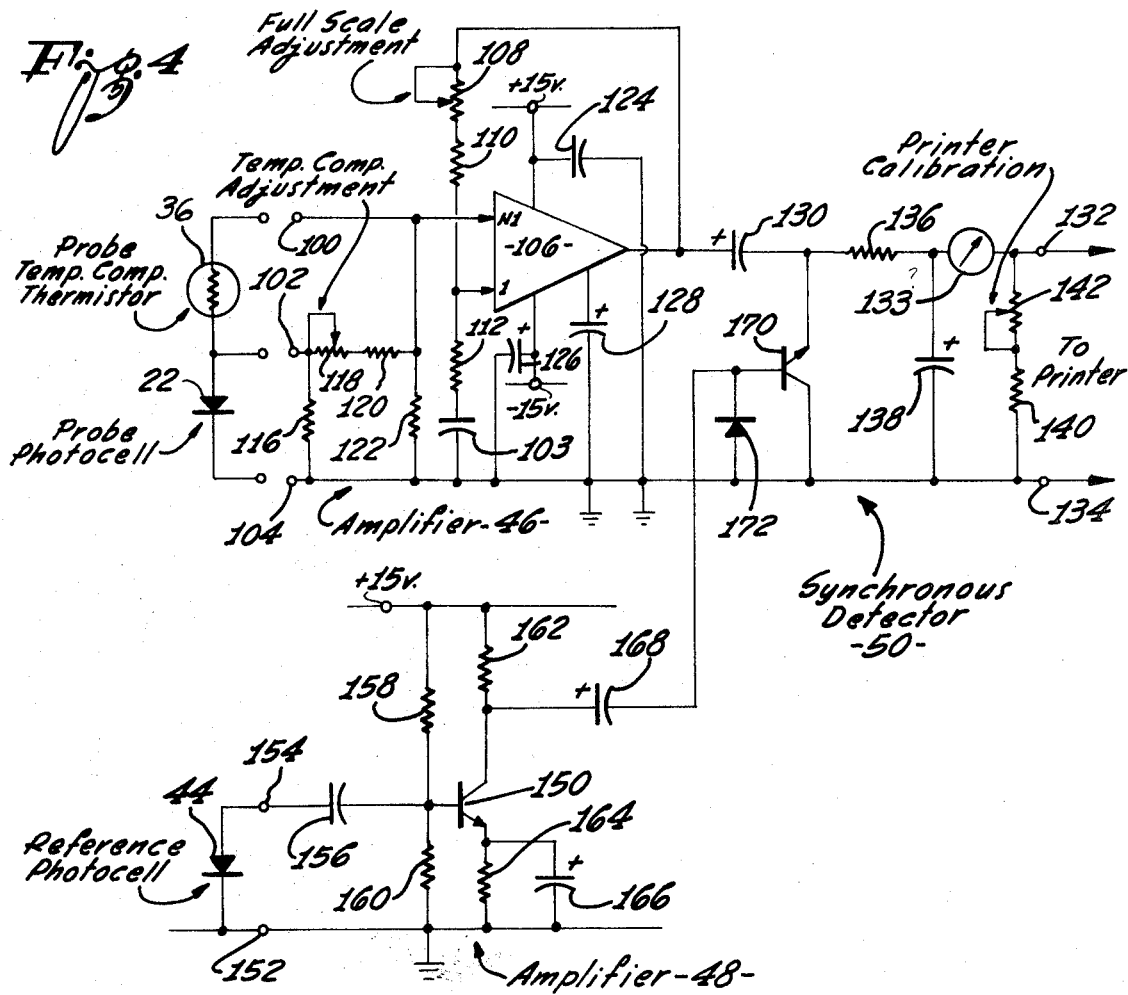
FIG. 4 is a circuit diagram appropriate for inclusion into the system of FIG. 1.

The apparatus of FIG. 1 includes a light source which is contained, for example, in a housing 10. The light source may be an incandescent lamp, or any other appropriate source may be used, depending upon the use to which the apparatus of FIG. 1 is to be placed. The light from the source emanates through outlets 12 and 14 in the housing 10, any appropriate and known type of optical system being used within the housing to accomplish this purpose.

The housing 10 also includes a drive motor for a light chopper wheel 16. The light chopper wheel may be any known type, and it is rotatably driven so as to interrupt the light emanating from the outlets 12 and 14 at a rate determined by the number of clear and opaque segments on the wheel 16 and by the speed at which the wheel is rotated.

A probe photometer member 18 which will be discussed in more detail in conjunction with FIGS. 2 and 3, is supported adjacent the housing 10, as shown in FIG. 1. The member 18 includes an elongated probe-like member which is configured to provide a pair of spaced-apart surfaces 19 and 20. As best shown in FIG. 2, the probe-like member 18 may be formed of a glass tube. The glass tube has been found to withstand a wide variety of fluids in which it may be immersed. However, it is apparent that other substances may be used.

In the construction of the probe of FIG. 2, the glass tube is softened at an intermediate point, for example, by the application of heat; and this intermediate point is deformed, as shown in FIG. 2, so as to define the spaced-apart surfaces 19 and 20. However, the original passage through the tube is maintained in an unblocked condition around the deformed section. A photocell 22 of any appropriate type is mounted within the tube adjacent the surface 20. A light pipe 24 is also mounted in the tube, and it extends longitudinally down the tube so that its lower end is positioned adjacent the surface 19. As best shown in FIG. 3, a usual electric plug 30 may be mounted at the upper end of the probe 18, the plug having a plurality of prongs 32, as shown. The light pipe 24 may extend up through a central aperture in the plug 30, as shown in FIG. 3.

The lower end of the glass tube may be closed by a plug 34 formed of Teflon, or other appropriate plastic material. The tube may, of course, be self-sealed at the end by heating the glass and drawing the end to a point.

The wires from the photocell 22 extend up the hollow passage in the glass tube and these wires may be connected to appropriate pins 32 of the plug 30. A thermistor element 36, or other temperature sensitive device, is mounted in the tube adjacent the photocell 22, and wires from this latter element may also extend up the passage in the glass tube to the other pins 32 of the plug 30. Likewise, a thermistor 38, or other temperature sensitive device, is mounted in the glass tube, adjacent the surface 19, but displaced up from the surface. Wires from this latter thermistor also extend up the passage and may be connected to other pins 32 of the plug 30. The thermistor 38 responds to the corresponding change in temperature when the probe is dipped into a liquid, and when the fluid covers the level of the thermistor 38 so that it serves as a liquid level indicator.

The aforesaid liquid, for example, may be contained in a test tube 40, as shown in FIG. 1. In an automatic system, a series of test tubes, such as the test tube 40, are transported on a conveyor rack successively to a position under the probe 18. Then, as each test tube arrives directly under the probe, automatic means raises the test tube up, so that the probe is immersed in the fluid contained in the test tube. The upward motion of the test tube continues until the liquid sensing thermistor 38 indicates that the probe is immersed in the liquid in the test tube, at which time the upward motion can be terminated and the corresponding reading taken. The temperature sensing device 36, on the other hand, senses the ambient temperature at the location of the photocell 22, and serves to compensate for the effect ambient temperature changes have on the photocell.

A rotatable wheel 42 is also provided, the wheel being positioned between the outlet 12 and the upper end of the light pipe 24. The wheel 42 may have different filters disposed at different angular positions about its center, and it may be turned by hand to interpose the various filters between the outlet 12 and the light pipe 24 for different spectrophotometric measurements. One of the filter areas in the wheel 42 may be left void, so as to permit a second wheel mounted coaxially with the wheel 42 and over the wheel 42, to interpose a second series of light filters in the optical path of the light pipe 24. In this manner, any desired number of optical filter wheels 42 may be stacked between the outlet 12 and the top of the light pipe, so that a large number of different light filters may be used.

A second photocell 44 is positioned adjacent the outlet 14. The photocells 22 and 44 are connected to respective amplifiers 46 and 48 which, in turn, are connected to a synchronous detector 50.

In the operation of the apparatus and system of FIG. 1, the light chopper wheel 16 is rotated at a predetermined rate. This means that the photocells 44 and 22 generate electric signals at a predetermined frequency. The amplitude of the output from the photocell 44 remains constant, whereas, the amplitude of the output from the photocell 22 is dependent upon the fluid in the test tube 40. The synchronous detector 50 provides an output which is representative of the output from the photocell 22, and which is independent of the ambient light level. This is because the system responds only to signals whose frequency is established by the light chopper 16, and is unresponsive to other signals.

The liquid level sensing thermistor 38 is used to provide a control signal, which is used in a suitable control system (FIG. 5) to cause the test tube 40 to be lifted when it is under the probe to a level such that the probe 18 will be immersed just below the level of the liquid in the test tube. This assures that all measurements will be made at a predetermined reference level with respect to the surface of the liquid as test tubes are successively moved under the probe and lifted into position to immerse the probe. The temperature sensing device 36, on the other hand, produces a control signal which is used, as will be described, to assure that the output from the photocell 22 will be independent of changes in ambient temperature which result from different temperatures of the liquids in the various test tubes in which the probe is immersed.

As mentioned above, the probe 18 is preferably composed of glass, since most plastic materials will dissolve in various fluids, and a glass probe tends to a more universal utility. However, obviously plastic or other types of probes may be used if so desired.

Appropriate circuitry for the amplifiers 46 and 48, and for the synchronous detector 50 of FIG. 1, is shown, for example, in FIG. 4. As shown in FIG. 4, the probe temperature compensation thermistor 36 and the probe photocell 22 are connected across terminals 100, 102 and 104 of the amplifier 46. The amplifier 46 includes an integrated circuit operational amplifier 106 of the type designated 809CE.

The terminal 100 is connected to one of the input terminals of the amplifier, and the output terminal is connected through a potentiometer 108 and resistor 110 to the second input terminal of the amplifier. The second input terminal is also connected to a resistor 112 which, in turn, is connected to a grounded capacitor 103. The potentiometer 108 may have a resistance, for example, of 500 kilo-ohms, the resistor 110 may have a resistance of 10 kilo-ohms, the resistor 112 may have a resistance of 100 ohms, and the capacitor 103 may have a capacity of 500 microfarads.

The terminal 104 is grounded. The terminal 102 is connected to a grounded 1 kilo-ohm resistor 116 and to a potentiometer 118. The potentiometer 118 has a resistance, for example, of 750 ohms, and it is connected through a 470 ohm resistor 120 to the first input terminal of the integrated circuit amplifier 106 and to a 4.7 kilo-ohm grounded resistor 122. The potentiometer 118 permits a manual adjustment to be made as to the extent of temperature compensation provided for the photocell 22 by the thermistor 36.

The integrated circuit amplifier is connected to a positive 15 volt source and to a negative 15 volt source, as shown. The positive 15 volt source and the negative 15 volt source are connected to respective 0.1 microfarad grounded capacitors 124 and 126. The integrated circuit amplifier 106 also has a terminal connected to a grounded capacitor 128, the latter capacitor having a capacity, for example, of 47 micromicrofarads.

The amplifier 46 is, as will be appreciated, an integrated circuit operational amplifier. Its output is coupled through a 1 microfarad capacitor 130 and a microammeter 133 to an output terminal 132. The other output terminal 134 is grounded. A filter comprising a series resistor 136 and a shunt capacitor 138 is interposed between the capacitor 130 and the microammeter and output terminal 132. The resistor 136 may, for example, have a resistance of 8.06 kiloohms, and the capacitor 138 may have a capacity of 300 microfarads. The microammeter may have a sensitivity of 50 microamperes for full scale deflection.

The output terminals 132 and 134 are connected to an appropriate printer, such as the instrument described in the aforesaid copending application. Calibration for the printer may be provided by a resistor 140 and a potentiometer 142 connected in shunt across the output terminals. A potentiometer 142 has a resistance of 500 ohms, and the resistor 140 may have a resistance of 1.91 kilo-ohms.

The reference photocell 44 is connected to the amplifier 48 which may comprise, for example, an NPN transistor 150 of the type presently designated 2N3053. The reference diode is connected, for example, to a grounded input terminal 152 of the amplifier 48 and to a second input terminal 154. The input terminal 154 is coupled through a 10 microfarad coupling capacitor 156 to the base of the transistor 150. The base is also connected to the common junction of a 100 kilo-ohm resistor 158 and 47 kilo-ohm grounded resistor 160. The resistor 158 is connected to the positive 15 volt source. A 6.8 kilo-ohm resistor 162 connects the collector of the transistor 150 to the positive 15 volt source. A 4.7 kilo-ohm resistor 164 shunted by a 300 microfarad capacitor 166 connect the emitter of the transistor 150 to ground.

The amplifier output from the transistor 150 is passed through a 10 microfarad coupling capacitor 168 to the base of an NPN transistor 170. The latter transistor, likewise, may be of the type designated 2N3053. A diode 172 is connected between the base and collector of the transistor 170, these elements being grounded, as shown. The emitter of the transistor 170 is connected to the junction of the capacitor 130 and resistor 136.

The transistor 170 and its associated circuitry functions as a synchronous detector for the outputs from the operational amplifier 106. That is, the amplifier 48 introduces a constant amplitude signal to the circuit of the transistor 170, the signal having a frequency determined by the light chopper 16. The circuitry operates in known manner, so that the only output appearing on the microammeter 133 and across the output terminals 132 and 134 is the amplifier output from the amplifier 46 which has the same frequency as the signal derived from the amplifier 48. The signal from the amplifier 106 of the synchronous frequency is that due to the light source in the housing 10, as interrupted by the light chopper 16, and has an amplitude which is a measure of the characteristic of the fluid in the test tube 40. In this way, the signal appearing on the microammeter 133 and across the output terminals 132 and 134 is independent of ambient light changes. Also, due to the action of the thermistor 36, the output is also independent of any changed temperature might have on the probe photocell 22.

Figure 5:
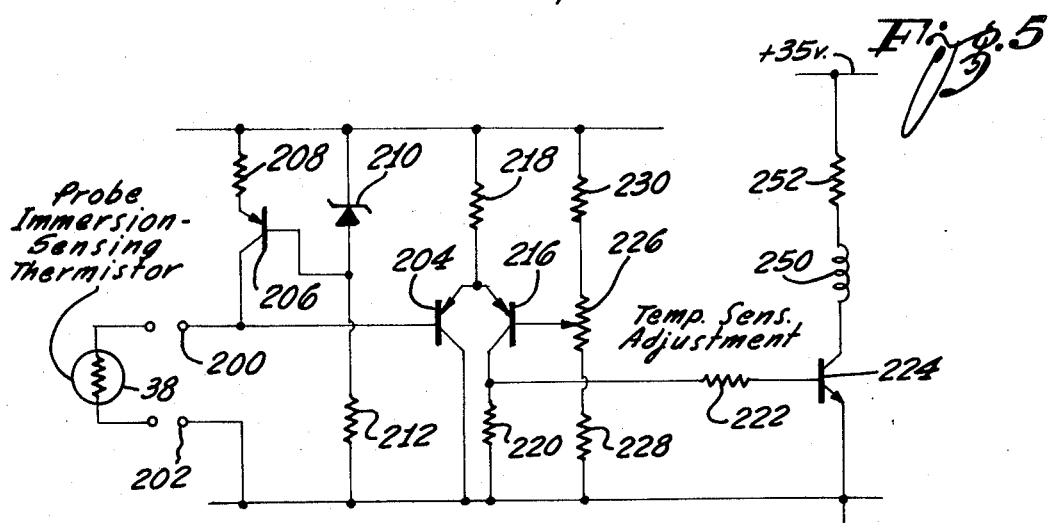
FIG. 5 is a circuit diagram of a fluid level sensing system.

The probe immersion sensing thermistor 38 of FIG. 1 may be connected to the terminals 200 and 202 of the circuit shown in FIG. 5. The terminal 202 is grounded, whereas the terminal 200 is connected to the base of a PNP transistor 204 and to the collector of a PNP transistor 206. Both these transistors may be of the type designated 2N2628. The emitter of the transistor 206 is connected through a 270 ohm resistor 208 to the positive 15 volt source. The base of the transistor 206, on the other hand, is connected to that source through a Zener diode 210, and also is connected to a grounded 1.8 kilo-ohm resistor 212.

The emitter of the transistor 204 is connected to the emitter of a similar PNP transistor 216, and the common emmiters are connected to the positive 15 volt source through a 1.2 kilo-ohm resistor 218. The collector of the transistor 216 is connected to a 4.7 kilo-ohm grounded resistor 220 and through a 1 kilo-ohm resistor 222 to the base of an NPN power transistor 224. The latter transistor may be of the type designated 2N3053.

The base of the transistor 216 is connected to the movable contact of a 5 kilo-ohm potentiometer 226. The potentiometer 226 is connected to a grounded 4.7 kilo-ohm resistor 228 and to a 4.7 kilo-ohm resistor 230. The latter resistor is connected to the positive 15 volt source, as shown.

The emitter of the transistor 224 is grounded, and its collector is connected through a relay energizing coil 250 and through a 470 ohm resistor 252 to a positive 35 volt source. The circuit is such that when the thermistor 38 indicates a particular temperature change, the relay coil 250 causes the associated relay to be energized. The associated relay, for example, may control the aforesaid elevating mechanism, so that the mechanism will position each test tube 40 of FIG. 1 at a point where the thermistor 38 falls below the level of the liquid in the test tube. The potentiometer 226 may be adjusted, so that a positive control of the relay 250 is effectuated, by the change in temperature sensed by the thermistor 38 when it becomes immersed in the liquid in the test tube 40.

The invention provides, therefore, improved probe photometer apparatus which is capable of making appropriate measurements of fluid samples, and which is independent of ambient light or temperature changes. The invention also includes an improved probe as a component of such apparatus, the probe being made in a commercially feasible manner, and being capable of easily being unplugged and plugged, when replacement is necessary.

It will be appreciated, of course, that while particular embodiments of the invention have been illustrated and described, modifications may be made. It is intended to cover such modifications in the claims.

What is claimed is:

1. A probe for use with a photometer apparatus, said probe comprising an elongated, rigid substantially tubular member including an open recess between its ends to define a pair of spaced apart, transparent surfaces, a radiation sensing device mounted in said tubular member and positioned adjacent one of said surfaces and an elongated radiation transmission element positoned within and extending longitudinally of said tubular member to a position adjacent the other of said surfaces for passing radiation from a source remote from said other surface to said other surface to radiate between said surfaces and activate said radiation sensing device in a manner responsive to the radiation absorbing characteristics of a fluid located between said surfaces and a fluid sensing device mounted in said probe-like member adjacent said other surface thereby to provide indication that said surfaces are immersed in said fluid.

2. Photometer apparatus for measuirng the absorption of radiation in a fluid having a probe comprising an elongated, rigid substantially tubular member including an open recess between its ends to define a pair of spaced apart, transparent surfaces, a radiation sensing device mounted in said tubular member and positioned adjacent one of said surfaces and an elongated radiation transmission element positioned within and extending longitudinally of said tubular member to a position adjacent the other of said surfaces for passing radiation from a source remote from said other surface to said other surface to radiate between said surfaces and activate said radiation sensing device in a manner responsive to the radiation absorbing characteristics of said fluid located between said surfaces and a fluid sensing device mounted in said probe-like member adjacent said other surface thereby to provide indication that said surfaces are immersed in said fluid.

3. The photometer apparatus defined in claim 2 and which includes a temperature sensitive device mounted in said tubular member and positioned adjacent said radiation sensing device.

4. The photometer apparatus defined in claim 2 in which said tubular member is formed of glass and sealed at one end.

5. The photometer apparatus defined in claim 4 and which includes a plug of a selected plastic material sealing said glass tube at said one end.

6. The photometer apparatus defined in claim 5 and which includes a plug member mounted on the end of said tubular member remote from said one end, with said radiation transmission element extending through an aperture in the center of said plug member.

7. The photometer apparatus defined in claim 2 in which said radiation transmission element comprises an elongated light pipe.

8. The photometer apparatus defined in claim 5 in which said plastic is polytetrafluoroethylene.

9. The photometer apparatus of claim 2 in which said open recess is located near one end of said elongated member, said one end comprising a plug of plastic material such as polytetrafluoroethylene.

* * * * *